(No Model.) 3 Sheets—Sheet 1.

C. KAESTNER.
APPARATUS FOR MASHING GRAIN.

No. 394,370. Patented Dec. 11, 1888.

(No Model.) 3 Sheets—Sheet 2.

C. KAESTNER.
APPARATUS FOR MASHING GRAIN.

No. 394,370. Patented Dec. 11, 1888.

Witnesses,
S. F. Mann,
Frederick F. Goodwin

Inventor.
Charles Kaestner.
By Offield & Towle, Attys.

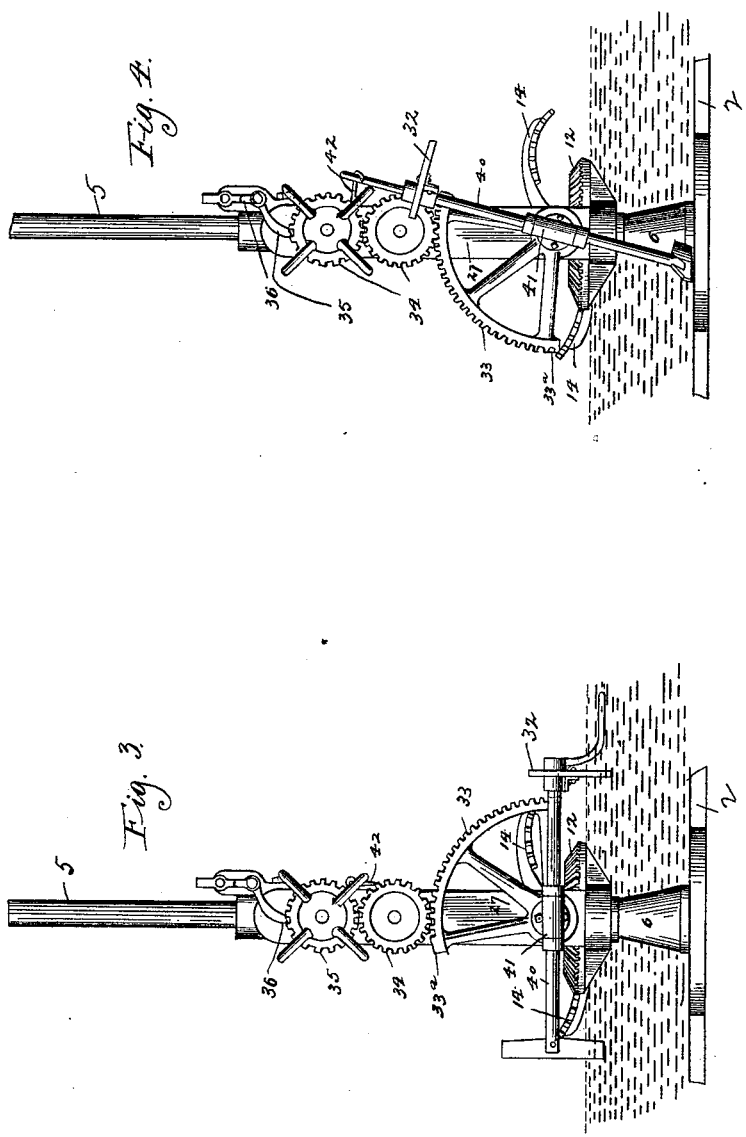

UNITED STATES PATENT OFFICE.

CHARLES KAESTNER, OF CHICAGO, ILLINOIS.

APPARATUS FOR MASHING GRAIN.

SPECIFICATION forming part of Letters Patent No. 394,370, dated December 11, 1888.

Application filed July 24, 1888. Serial No. 280,944. (No model.)

*To all whom it may concern:*

Be it known that I, CHARLES KAESTNER, of Chicago, Illinois, have invented certain new and useful Improvements in Apparatus for Mashing Grain, of which the following is a specification.

My invention relates to an improvement in mashing-machines of the type described in the Letters Patent issued to me August 20, 1878, No. 207,283. At one of the stages of the mashing process the beer or wort is drawn off from the meal, and, the latter settling in the bottom of the mashing-tub, a hard crust forms on the surface thereof, which it is necessary to break up in order to sprinkle the mash, which sprinkling with water washes out a considerable remnant of beer or wort. In said patent, and also in the application for Letters Patent filed by me April 7, 1888, Serial No. 269,960½, I have described a mashing-machine which employs revolving shovels for lifting the meal from the bottom of the mash-tub, and also for discharging it therefrom, revolving mixers which mix the mash, and rakes combined with said shovels, whereby said crust is broken up preparatory to the sprinkling process. In said application I have described means whereby the mixer-shaft may be raised from contact with the mash at one stage of the operation, and also means whereby the rakes and shovels may be brought alternately into position to operate upon the mash — the former to scratch or break up the crust and the latter to lift the mash from the bottom of the mash-tub and also to discharge it.

In my present improvements I employ revolving mixers, having suitable means whereby they may be thrown into or out of operative contact with the mash, and also the combined shovels and rakes and simple means for reversing said shovels and rakes.

The principal difference between my present improvements and that described in said application, so far as relates to the revolving mixers, is that, as described in said application, the mixer-shaft is vertically movable to bring it into or out of operative contact with the mash, while in my present improvement said mixer-shaft is not adjustable vertically, but it is so controlled that its mixers may be held out of contact with the mash, and I have also provided improved means whereby to reverse the shovels and rakes to bring them alternately into position to operate on the mash.

Figure 1:
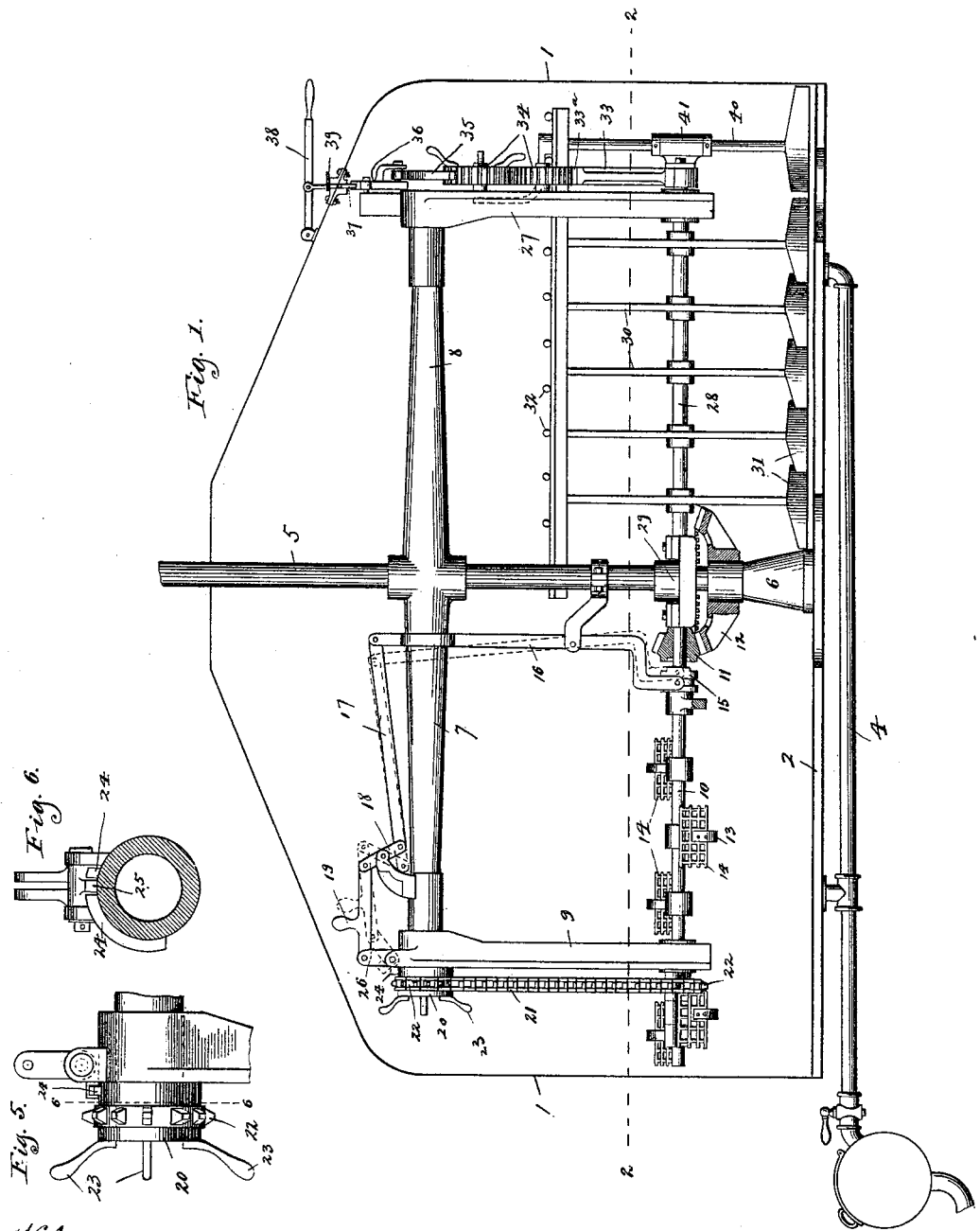
Figure 2:
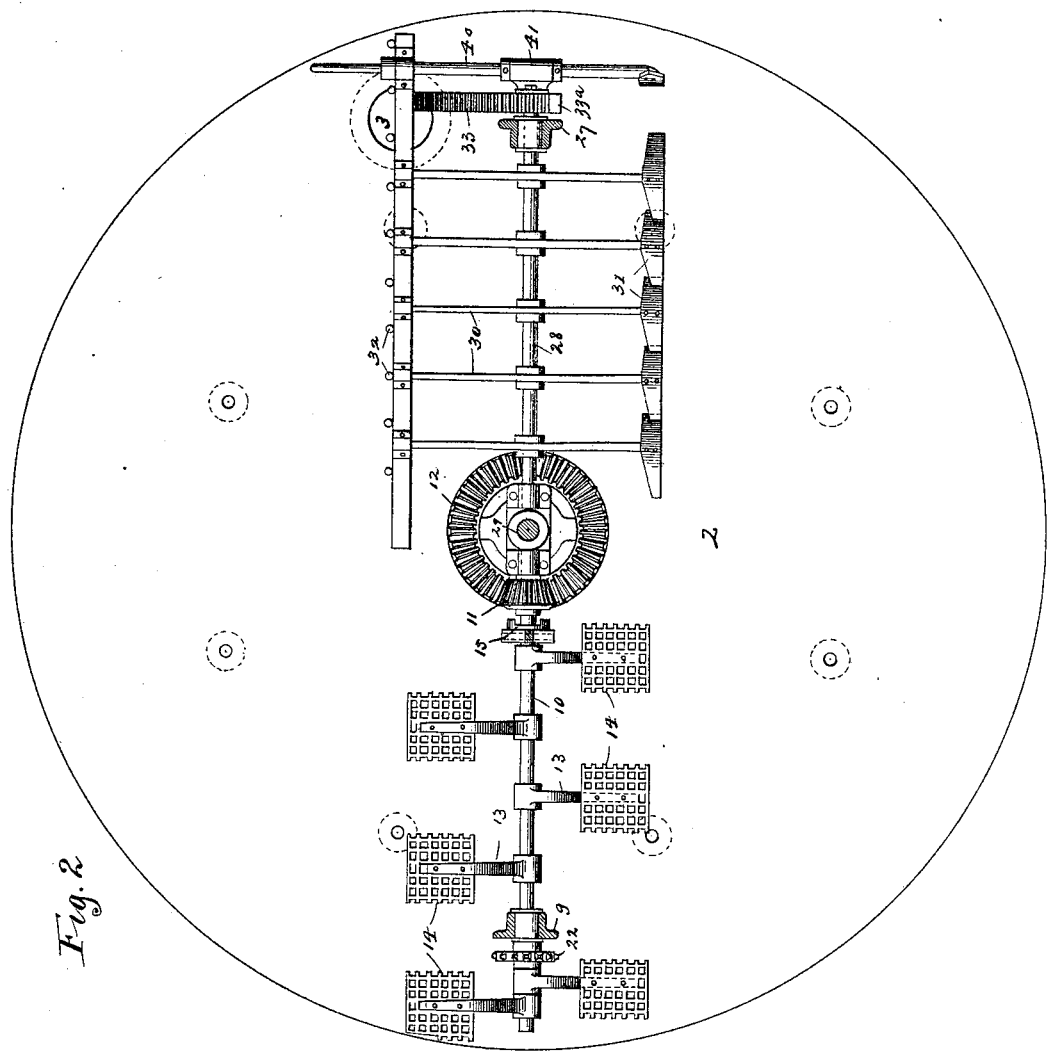

In the accompanying drawings, Figure 1 is a side elevation of the operative parts of a mashing-machine, the tub itself being shown in vertical section. Fig. 2 is a plan view of said operative parts below the line 2 2 in Fig. 1. Fig. 3 is an end elevation of said operative parts, looking in the longitudinal direction of the shovel and rake shaft, and showing the rakes in operative position. Fig. 4 is a similar view, but showing the shovels in operative position. Fig. 5 is a detail view showing in side elevation a portion of the mechanism for operating the mixer-shaft, and Fig. 6 is a section on line 6 6 of Fig. 5.

In the drawings, 1 represents the side wall, and 2 the bottom, of the mash-tub, which mash-tub has the vent or discharge-opening 3 and the pipe 4, through which the wort or beer is drawn off. A vertical rotatable shaft, 5, is stepped into a fixed stud, 6, bolted to the bottom of the mash-tub at its axial center. Horizontal arms 7 8 project outwardly from the shaft 5 in opposite directions and to equal distances. The arm 7 carries at its outer end a hanger, 9, in the lower end of which hanger is journaled the mixer-shaft 10, and said shaft carries a loose pinion, 11, which meshes with a beveled gear, 12, secured upon the fixed stud 6. On the said mixer-shaft the arms 13 of the mixers 14 are disposed radially. A sliding clutch, 15, works on a feather on shaft 10, which clutch is moved by means of a lever, 16, arm 17, pivoted link 18, and handle 19; but any other suitable devices may be substituted for this set of clutch-levers.

As shown in Fig. 1, the clutch is thrown out of engagement with the beveled gear; but a movement of the handle 19 to the right will operate through the levers 18, 17, and 16 and throw it into engagement with the pinion 11, whereby motion may be imparted to the mixer-shaft. The means for throwing the mixers out of contact with the mash and into the position shown in Figs. 3 and 4 comprise a sleeve, 20, which may be carried by the arm 7 and chain 21, passing over sprocket-wheels 22 22, set, respectively, on the sleeve 20 and the mixer-shaft 10. Handles 23 afford means for rotating the sleeve 20, and said sleeve is provided on its periphery with lugs 24, between which a locking-notch is provided for a detent, 25, on the end of a pivoted lever, 26, to which one end of arm 19 is pivoted. Now, after the wort or beer is drawn off and it is desired to break up the crust which forms after it is settled, the clutch 15 is thrown out of engagement with the pinion 11, and the mixer-shaft is rotated by means of the chain 21 until the mixers 14 lie in a horizontal plane, and then locked in said position by the detent 25 entering the locking-notches between the segments 24. The arm 8 has a hanger, 27, in which is journaled the shovel and rake shaft 28, the inner end of said shaft having a bearing in a hub, 29, set upon the shaft 5, in which hub the shaft 10 also has a bearing.

30 represents arms set in the same plane on the shaft 28, one end of said arms bearing shovels 31, which latter are set obliquely to the shaft 28, as shown in Fig. 2. At the opposite end of said arms 30 are secured the rakes 32, which may set in line with each other. The shaft 28 is not revoluble, but moves around with the shaft 5. It is adapted to be rocked in its bearings to bring either the shovels or rakes in position, as desired, and this may be effected by means which I will now describe.

A segment, 33, having cogs on its periphery, is secured upon the outer end of the shaft 28, to which motion is imparted by the spur-gears 34, carried by studs projecting from the hanger 27. The spur-gears are rotated by a pawl, 35, which is carried by a pivoted lever, 36. This lever is engaged by a stud, 37, secured to a pivoted lever, 38, and protruded through the top of the mash-tub. Stud 37 has transverse pin-holes, through one or the other of which a pin, 39, is thrust, according as it is desired to have the stud in or out of engagement with the lever 38. The hoes are gradually inserted into the mash automatically, easily and without danger of breaking the machinery, simply by projecting the stud 37 into the path of the lever 38. At each revolution of the central driving-shaft the stud 37 will engage lever 38, which, being rocked, will thrust the pawl into engagement with the gear 34 and move it forward the space of one tooth. This movement will be imparted to the segment 33, and the latter will rock the shaft 28 correspondingly. This train of gearing will be so proportioned as to turn the shaft 28 one-quarter of a revolution, which will bring the shovels and rakes into the position shown in Fig. 3. When it is desired to lift the hoes out of the mash, the shaft 28 is rocked back, reversing the movement of the gears by the use of the handles on the upper gear-wheel, 34, and when brought into horizontal position the train of gears may be locked by any convenient means—as, for example, by providing a broad tooth, 33ª, at one end of the segment 33, which will prevent the further movement of the gear in one direction, while the engagement of the gear 34 by the pawl will prevent the rotation in the opposite direction.

In order to enable the outer shovel to operate close to the walls of the mash-tub, I secure the arm of said shovel, which is marked 40, in a sleeve, 41, and the upper end of the arm 40 may be engaged by a locking-hook, 42, whereby to hold said arm in operative position. When the shovels are elevated out of the mash, the arm 40 is turned in the sleeve 41, so that the shovel which it carries on its lower end is turned inwardly to clear the wall of the tub.

In Fig. 4 the shovels are shown in operative position, while in Fig. 3 said shovels are turned up out of engagement with the mash, and the rakes are shown in position to operate upon the top of the mass. The mixers are also shown in Fig. 3 in the position they occupy during the raking or scratching process. Shaft 5, revolving, will cause the rakes to break up the crust, and after this water is sprinkled upon the mass to wash out the remnant of beer or wort, and when this is drawn off the shovels are thrown down and operated to discharge the meal from the tub through the orifice 3 in the tub-bottom.

It is obvious that other means for rocking the mixer-shaft than above described may be employed, and hence I do not confine my invention to the sprocket-and-chain mechanism, but intend to employ any equivalent means—as, for example, a hand-wheel may be affixed directly to the end of the mixer-shaft or a rigid arm extended therefrom, and said hand-wheel or arm might be operated from the top of the machine, as in the construction above described. It is also obvious that other locking means may be substituted for the segment-and-detent arrangement. I prefer the gear system shown for rocking the shovel-shaft; but of course, instead of the specific gearing described, equivalent gearing may be employed.

I claim—

1. In a mashing-machine, the combination, with the power-shaft, of a rotatable mixer-shaft driven therefrom and having mixers extended on opposite sides thereof in substantially the same plane, and means for rocking said shaft in its bearings, whereby to cause the mixers to clear the mash, and means for locking the shaft in position, substantially as described.

2. In a mashing-machine, the combination, with a vertical power-shaft located axially of the mash-tub, of a longitudinal arm rigidly fixed upon said shaft toward the top of the mash-tub, a mixer-shaft extended parallel to and below said arm, pulleys secured upon said arm and upon said shaft, respectively, and a belt passed over said pulleys, and means for rotating the pulley of the arm, whereby to rock the mixer-shaft in its bearings, substantially as described.

3. In a mashing-machine, the combination, with the power-shaft, of a longitudinal arm, a rotatable mixer-shaft extended parallel to and below said arm, pulleys mounted upon said shaft and said arm, respectively, a belt passed over said pulleys, a hand-wheel for rotating the pulley of the arm to rock the shaft in its bearings, and suitable locking mechanism, substantially as described.

4. In a mashing-machine, the combination, with the power-shaft, rotatable mixer-shaft, and suitable gearing whereby motion may be imparted from the power-shaft to the mixer-shaft at will, of gearing for rocking the mixer-shaft in its bearings independently of the power-shaft to elevate the mixers out of contact with the mash, and locking mechanism for locking the mixer-shaft in such position, substantially as described.

5. In a mashing-machine, the combination, with the power-shaft, an arm extended horizontally therefrom, a mixer-shaft parallel to and below the said arm, a clutch whereby motion may be communicated from the power-shaft to the mixer-shaft, gearing whereby the mixer-shaft may be rocked independently of the power-shaft to elevate the mixers out of contact with the mash, and means for simultaneously operating the clutch and for locking the mixer-shaft, substantially as described.

6. In a mashing-machine, the combination, with the power-shaft, a rigid shaft extended therefrom having arms secured thereon, said arms bearing shovels at one end and rakes at the other, and means for rocking said shaft, comprising a gear-segment secured thereon, a gear-wheel enmeshed with said segment, and a pawl engaging said gear-wheel and adapted to be operated by contact with a stationary part of the machine, substantially as described.

7. In a mashing-machine, the combination, with the shovel-shaft, of a gear-segment secured on the outer end of said shaft, one or more gear-wheels in train with said segment, a pawl adapted to engage the teeth of one of said gear-wheels, a lever connected to said pawl, and a fixed stud secured to the walls of the mash-tub in the path of the lever, whereby to rock the shaft through the intervention of the described mechanism, substantially as described.

8. In a mashing-machine, the combination, with the rake and shovel shaft, of a supplemental rake and shovel arm bearing a shovel and rake on its respective ends, located at the outer end of said shaft and adapted to operate close to the walls of the mash-tub, said arm being sleeved in its bearing, and means for locking it in an operative position, substantially as described.

CHARLES KAESTNER.

Witnesses:
FREDERICK C. GOODWIN,
C. C. LINTHICUM.